United States Patent [19]

Munter

[11] Patent Number: 4,470,139

[45] Date of Patent: Sep. 4, 1984

[54] SWITCHING NETWORK FOR USE IN A TIME DIVISION MULTIPLEX SYSTEM

[75] Inventor: Ernst A. Munter, Kanata, Canada

[73] Assignee: Northern Telecom Limited, Montreal, Canada

[21] Appl. No.: 335,262

[22] Filed: Dec. 28, 1981

[51] Int. Cl.³ .............................................. H04J 3/02
[52] U.S. Cl. ........................................ 370/66; 370/63
[58] Field of Search ....................... 370/58, 64, 66, 63

[56] References Cited

U.S. PATENT DOCUMENTS

| | | | |
|---|---|---|---|
| 3,678,205 | 7/1972 | Cohen et al. | 370/66 |
| 3,851,105 | 11/1974 | Regnier et al. | 179/15 |
| 3,959,596 | 5/1976 | Bojanek et al. | 179/15 |
| 4,032,719 | 6/1977 | Blasbalg | 179/15 |
| 4,123,624 | 10/1978 | Gagnier et al. | 179/15 |

FOREIGN PATENT DOCUMENTS 39948 11/1984 European Pat. Off. .

OTHER PUBLICATIONS

Electronics, vol. 54, No. 20, Oct. 6, 1981, pp. 133–135, New York, U.S.A., L. Reaume: "Cross-Point Array IC Handles 256 Voice and Data Channels", p. 134, left-hand column, line 6, p. 134, right-hand column, line 23, FIG. 2.

Arich Fur Elektronik und Ubertragungstechnik, vol. 35, No. 1, Jan. 1981, pp. 7–19, S. Hirzel Verlag, Stuttgart, D. E. A. Lotze et al.: "Verkehrsleistung und Wirtschaftliche Struktur von PCM-Koppelanordnungen in Digitalen Fernsprechvermittlungsstellen", p. 12, paragraph No. 5.2; FIG. 9.

Primary Examiner—Douglas W. Olms
Assistant Examiner—Frank M. Scutch, III
Attorney, Agent, or Firm—Robert C. Hogeboom

[57] ABSTRACT

A non-blocking switching network for use in a TDM (time division multiplex) system for switching digital signals carried on incoming buses to outgoing buses (e.g. in a telephone switching office) is disclosed. Each outgoing bus has associated therewith storage devices capable of storing, at least temporarily, all the data received from all the incoming buses. Appropriate control equipment controls which of the incoming channels, stored in the respective storage devices, is applied to the respective outgoing bus. In short, each outgoing bus has associated with itself, dedicated storage devices from which data is applied only to that respective outgoing bus. By this technique, every outgoing bus has access to all the channels on all the incoming buses.

11 Claims, 4 Drawing Figures

SWITCHING NETWORK FOR USE IN A TIME DIVISION MULTIPLEX SYSTEM

FIELD OF THE INVENTION

The present invention relates generally to telecommunication switching systems or the like and more particularly to a switching network for use with PCM (pulse code modulation) signals in a TDM (time division multiplex) environment.

BACKGROUND OF THE INVENTION

A switching system is provided in conventional telephone systems for interconnecting transmission paths between subscribers. In the contemporary systems employing PCM and TDM techniques, the switching systems are commonly based upon either a space-time-space configuration or upon a time-space-time configuration. U.S. Pat. No. 4,123,624 dated Oct. 31, 1978 by R. Gagnier et al and U.S. Pat. No. 3,851,105 dated Nov. 26, 1974 to A. Regnier et al depict examples of time-space-time switching systems.

In time-space-time switching system, switching is accomplished by first switching a given channel in time, then switching it in space, and finally, once again switching it in time; hence the name time-space-time representing a time-switch, a space-switch, and a time-switch. In essence, a time-space-time switch functions to switch a channel from one assigned timeslot in an incoming bus to one assigned timeslot in an outgoing bus. This concept is well known in the art of switching. A space-time-space switch is similar in operation to the time-space-time switch except of course for the fact that it has two stages of space switching and only one stage of time switching.

Another concept to be considered in a switching system is network blocking. Network blocking refers to the inability of a switching system to provide a connection between two idle end-points. In other words, two subscribers cannot be connected together by the switching system because all available paths through the network (of the switching system) are in use. Present multistage switching networks (e.g. time-space-time switches) exhibit some degree of blocking. A single stage timeswitch is inherently non-blocking, but the number of channels that can be served by a single timeswitch is limited by the speed of the memory devices employed. One object of the present invention is to provide a method and a circuit by which a relatively large (e.g. 2048 channels) non-blocking switching network may be constructed. Note, that for the purposes of this description, a switching network is considered to be comprised of a switching module (which performs the actual switching chores) and a control module to control the operation of the switching module.

SUMMARY OF THE INVENTION

Stated in simplistic terms, the present invention performs the function of switching channels both in time and in space in the following manner. Each outgoing bus has associated therewith memory (or storage) devices capable of storing, at least temporarily, all the data received from all the incoming buses. Appropriate control equipment controls which of the incoming channels, stored in the respective memory devices, is applied to the respective outgoing bus. In short, each outgoing bus has associated with itself, dedicated memory devices from which data is applied only to that respective outoging bus. By this technique, every outgoing bus has access to all the channels on all the incoming buses.

Stated in other terms, the present invention is a switching network for use in a TDM (time division multiplex) system for switching digital signals carried in timeslots on N incoming buses to timeslots on M outgoing buses, wherein N and M are positive integers, $N \geq 2$, and $M \geq 2$, the network comprising: a plurality of storage means, the plurality of storage means being divided into N first groupings of M storage means each, each first grouping being responsive to a respective incoming bus; and each outgoing bus being responsive to a respective one of M second groupings of the storage means, each second grouping comprising N storage means, one from each of the first groupings.

Stated in yet other terms, the present invention is a method for use in a TDM (time division multiplex) system for switching digital signals carried in timeslots on N incoming buses to timeslots on M outgoing buses, wherein N and M are positive integers, $N \geq 2$, and $M \geq 2$, the method comprising: storing the data received from an incoming bus in a respective one of N first groupings, wherein each one of the first groupings comprises M storage means; and applying the data from a second grouping of storage means to a respective outgoing bus, wherein there are M second groupings and wherein each second grouping comprises N storage means, one from each of the first groupings.

BRIEF DESCRIPTION OF THE DRAWINGS

The invention will now be described in more detail with reference to the accompanying drawings, wherein like parts in each of the several figures are identified by the same reference character, and wherein.

DETAILED DESCRIPTION

Figure 1:
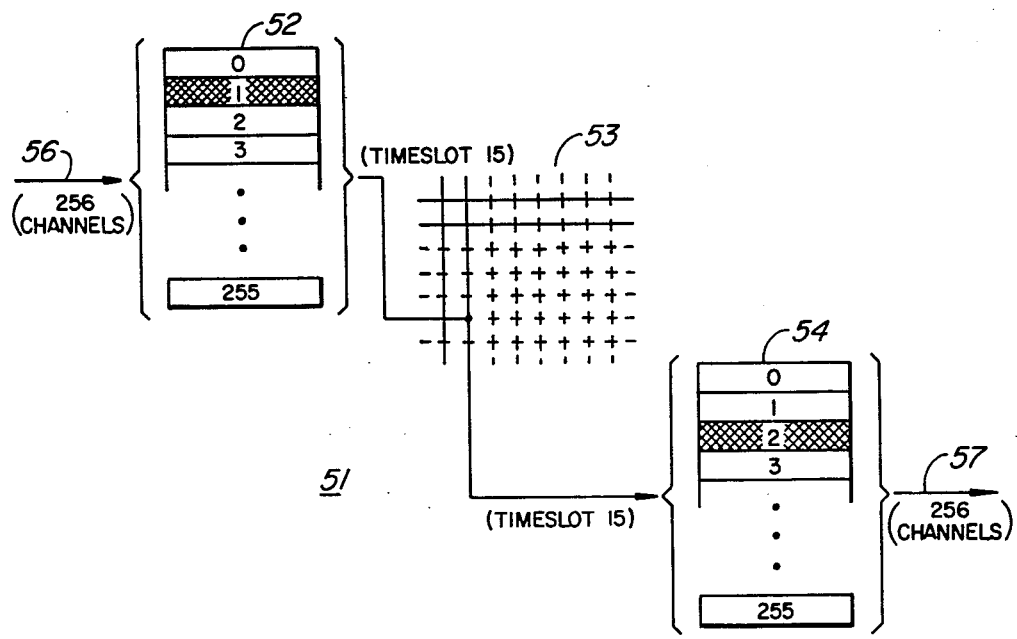
FIG. 1 is a simplified representation of a prior art time-space-time switching network.

FIG. 1 is a simplified symbolic representation of a time-space-time switching network 51 (also referred to as a three stage switching network). Network 51 comprises a time switch 52, a space switch 53, and a time switch 54, interconnected as depicted in FIG. 1. As this concept is well known it will be described here only briefly. A single bus 56 having 256 channels is depicted entering time switch 52. Assume that the channel under consideration on bus 56 is assigned to timeslot 1 as depicted by the shaded area in time switch 52.

Time switch 52 serves to switch channels between timeslots, and in the example illustrated in FIG. 1, has switched the channel of interest from incoming timeslot 1 to internal time slot 15 of space switch 53. When incoming timeslot 1 arrives, the information contained therein is stored until the internal timeslot 15 arrives, thus we have time switching. When internal timeslot 15 arrives it carries the information through an assigned crosspoint in space switch 53. This assigned crosspoint interconnects an incoming TDM bus 56 with an outgoing TDM bus 57 (note that in this simplified example there is depicted only one incoming TDM bus, i.e. 56, and there is depicted only one outgoing TDM bus, i.e. 57). Thus we have switched in space. Note that the crosspoint (in switch 53) is assigned only for the duration of the sample (i.e. for one timeslot), and for other 255 timeslots of the frame, switch 53 can be assigned other crosspoints.

The information is output from space switch 53 in timeslot 15, the same timeslot on which it was entered. The information is then applied (still on timeslot 15) to space switch 54 where it is stored until timeslot 2 arrives to carry the signal further. Thus we have once more switched in time. This sequence of time-space-time switching is repeated once each frame for our signal on incoming timeslot 1 (note: one frame contains 256 timeslots in this example).

Figure 2:
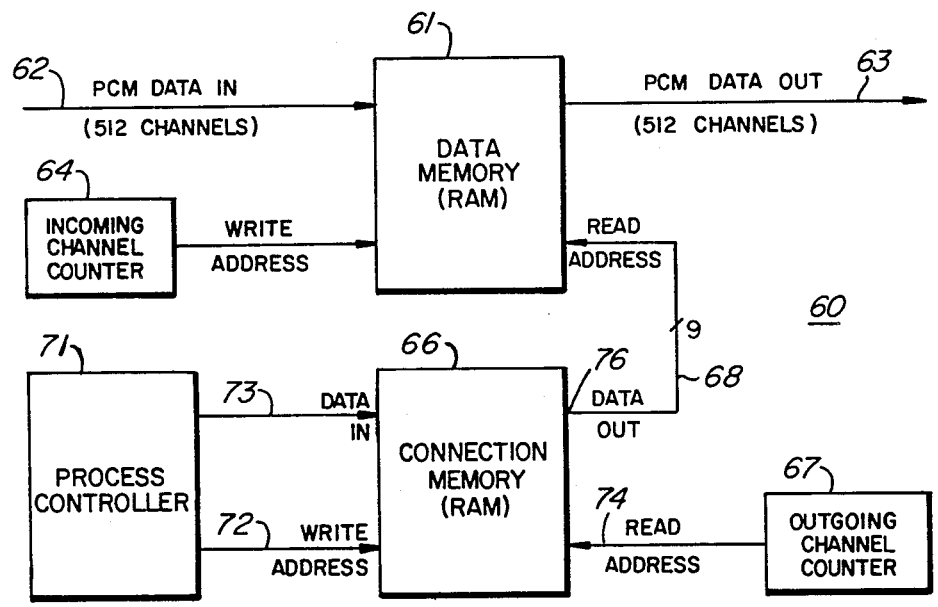
FIG. 2 is a simplified block diagram depicting a prior art "simple" time switch.

FIG. 2 is a simplified block diagram of a typical time switch 60. The incoming channels (512 in number) are applied to data memory 61 via TDM bus 62. In the illustrative embodiment of FIG. 2, bus 62 carries each PCM sample (from the 512 channels) in parallel, in a sequential fashion, at the rate of one PCM sample approximately every 200 nanoseconds (note: the actual duration needed for writing is approximately 100 nanoseconds). In such an embodiment, data memory 61 comprises three RAMs (random access memory) such as Intel's model no. 2148, capable of storing 512 binary words, each word having up to ten bits. The outgoing channels are read from data memory 61 and are applied to outgoing TDM bus 63, in parallel, at the rate of one PCM sample approximately every 200 nanoseconds.

In simplistic terms, incoming channel counter 64 basically keeps track of which channels are being received at any given instant and produces an address appropriate for each channel, such that when a given channel is received by data memory 61 it is stored in memory 61 at the address given by counter 64. Note that data memory 61 has 512 memory locations, one for each channel. The incoming PCM data on TDM bus 62 are written sequentially into storage locations in date memory 61 under control of incoming channel counter 64. In other words, a specific PCM sample is stored in data memory 61 at an address corresponding to the incoming channel number as designated by counter 64. Note that counter 64 is simply a sequential counter, counting in increasing order from 0 to 511 in step with the incoming channels, and then repeating its count over and over again.

Connection memory 66 (e.g. Intel RAMs, model no. 2148) contains a set of incoming channel addresses. The function of memory 66 is to send a read address (via bus 68) to data memory 61, at the appropriate time, (determined by outgoing channel counter 67) to cause a PCM sample stored in data memory 61 to be read out on bus 63. Connection memory 66 achieves this as follows.

As an example, assume that channel 400 on incoming bus 62 is to be connected to channel 501 on outgoing bus 63. Process controller 71 produces the address for channel 501 on address bus 72 and simultaneously provides on data bus 73 the address for channel 400, to be stored as data in memory 66 at the location specified by address bus 72. Subsequently, when the read address corresponding to channel 501 is applied to connection memory 66, from outgoing channel counter 67, via read address bus 74, the data output on data output 76 (applied to the read address bus 68 of data memory 61) is in fact the address for data memory 61 corresponding to the location wherein channel 400 from input bus 62 has been stored. Thus, in simplistic terms, counter 67 addresses connection memory 66 with the address for channel 501, connection memory 66 produces the address of channel 400 on data output 76 and in turn applies it to the read address input for data memory 61 and the PCM word from channel 400, stored in memory 61 is applied to TDM bus 63 during channel 501. In summary, for any outgoing channel, any incoming PCM sample can be selected by appropriately loading connection memory 66 from processor 71.

Figure 3:
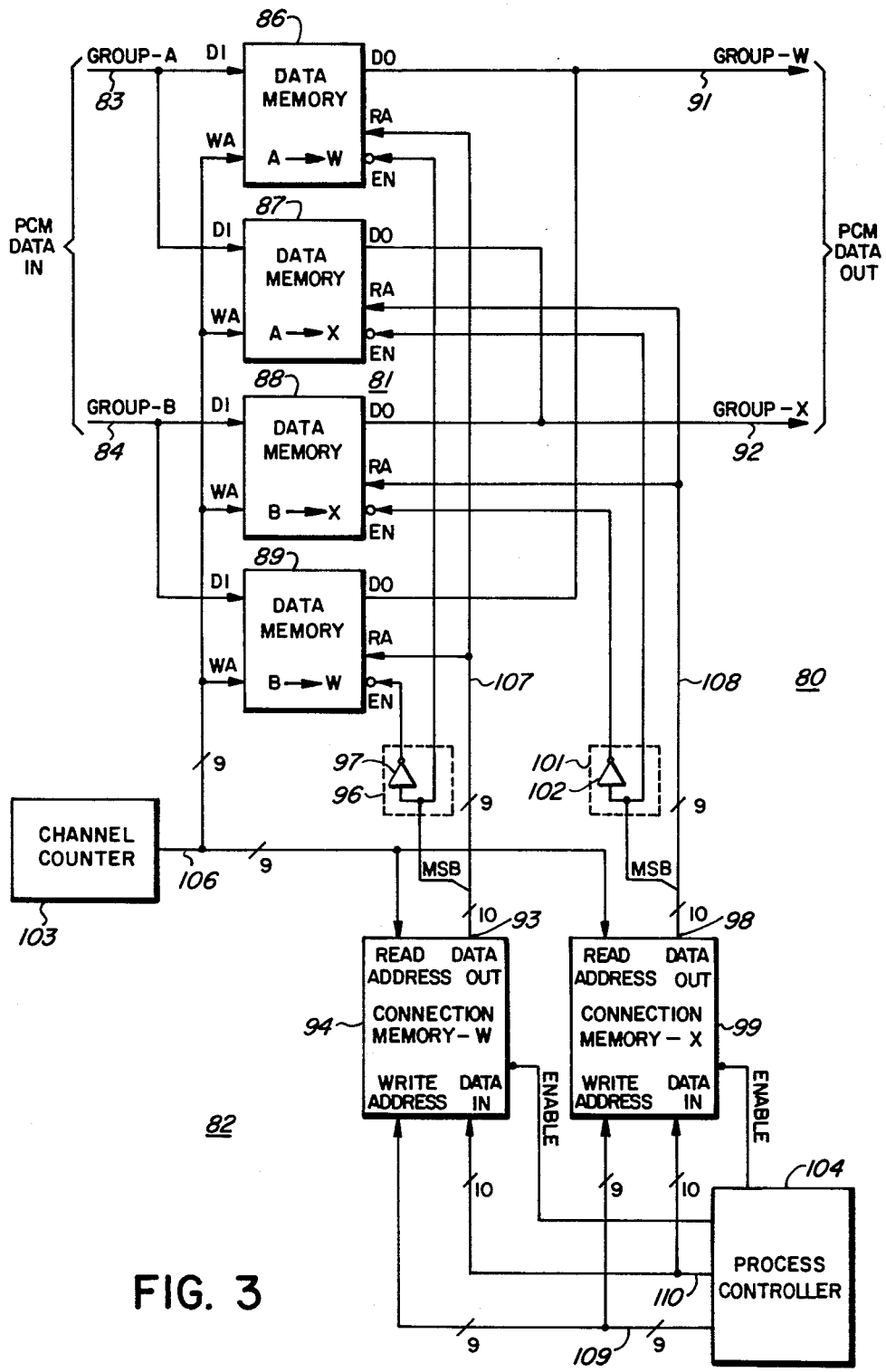
FIG. 3 is a simplified block diagram depicting the preferred embodiment of the present invention for switching 1024 channels.

FIG. 3 depicts one preferred embodiment of the present invention; i.e. switching network 80 comprised of switching module 81 and control module 82. The components thereof are interconnected as depicted in FIG. 3 and attention is directed thereto.

Incoming bus 83 carries 512 channels sequentially, in parallel, and applies them to both data memory 86 and data memory 87. Likewise, incoming bus 84 carries 512 channels sequentially, in parallel, and applies them to both data memory 88 and data memory 89. As an aid to describing the operation of the invention, the channels on bus 83 will be referred to as "Group-A" channels and those on bus 84 will be referred to as "Group-B" channels. Similarly, the channels on outgoing bus 91 will be referred to as "Group-W" channels and those on outgoing bus 92 as "Group-X" channels. Note that data memory 86 (e.g. three Intel model no. 2148) can store 1024 binary words of ten bits each; memories 87, 88 and 89 each have the same capacity as memory 86.

The object of switching network 80 is to be able to switch any one of the 512 channels appearing either on bus 83 or 84 to any one of the 512 channels appearing either on bus 91 or 92. The principle behind how switching network 80 accomplishes this is as follows.

PCM data received on bus 83 is stored in both data memories 86 and 87. PCM data received on bus 84 is stored in both data memories 88 and 89.

PCM data on outgoing bus 91 is read either from data memory 86 (containing the Group-A channels) or from data memory 89 (containing the Group-B channels). The selection of either data memory 86 or data memory 89 applying data, at any given instant, to bus 91 is accomplished by the most significant bit (MSB) from data output terminal 93 of connection memory 94. Output terminal 93 provides ten binary bits, the most significant one of which is applied to decoder 96 (containing a single inverter 97); the remaining nine binary bits are applied to the read address (RA) terminals of both data memories 86 and 89. The purpose of decoder 96 is to ensure that only one of memories 86 and 89 is read at any given instant in time.

PCM data on outgoing bus 92 is read either from data memory 87 (containing the Group-A channels) or from data memory 88 (containing the Group-B channels). The selection of either data memory 87 or data memory 88 applying data, at any given instant, to bus 92 is accomplished by the most significant bit (MSB) from data output terminal 98 of connection memory 99. Output terminal 98 provides ten binary bits, the most significant one of which is applied to decoder 101 (containing a single inverter 102); the remaining nine binary bits are applied to the read address (RA) terminals of both data memories 87 and 88. The purpose of decoder 101 is to ensure that only one of memories 87 and 88 is read at any given instant in time.

As a result, bus 91 has access to any of the input channels on buses 83 and 84. Similarly, bus 92 has access to any of the input channels on buses 83 and 84.

As an illustrative example, assume that a channel on bus 83 is to be connected to a channel on bus 91. As data from all the channels of bus 83 are stored in data memory 86 (at least temporarily), bus 91 can receive the data from the required channel, as stored in data memory 86, under the control of connection memory 94. In a like manner, if a channel on bus 83 is to be connected to a channel on bus 92, data memory 87 is accessed, under the control of connection memory 99. Since data memory 87 stores (at least temporarily) data from all the channels of bus 83, all the data from those channels are available to be applied to bus 92 as required.

In a similar fashion any channel on bus 84 can be applied to bus 92 (via data memory 88) and any channel on bus 84 can be applied to bus 91 (via data memory 89). As a result, bus 91 has access to any one of the 512 channels received on bus 83 and to any one of the 512 channels received on bus 84. Similarly, bus 92 has access to any one of the 512 channels received on bus 83 and to any one of the 512 channels received on bus 84.

Control module 82 of switching network 80 will now be described in somewhat more detail. It should be noted that control module 82 of switching network 80 is not unlike the control portion of time switch 60 depicted in FIG. 2. Control module 82 of network 80, however, does have the addition of decoders 96 and 101; it has two connection memories 94 and 99 in lieu of only one; it has only a single channel counter 103 to provide both write addresses to data memories 86, 87, 88 and 89 and read addresses to connection memories 94 and 99 (note that in FIG. 2, channel counters 64 and 67 could be replaced by a single counter for certain applications); and process controller 104 completes the major components of control module 82.

In operation, the output of channel counter 103 provides a nine bit address, on address bus 106, for data memories 86, 87, 88, and 89 and for connection memories 94 and 99. Counter 103 is constructed from Texas Instruments model no. 74S163 counters and counts in increasing order from 0 to 511 in step with the incoming channels, and then repeating its count over and over again. Each one of memories 86, 87, 88, and 89 is written sequentially as the data appears on its respective data input DI. The address at which the data is stored is of course defined by the binary address from counter 103 applied, via address bus 106, to the respective write address inputs WA. A specific PCM sample, from a given channel, is stored in two data memories. For example, a PCM sample from a channel on bus 83 is stored in both data memories 86 and 87 at an address corresponding to the incoming channel number.

The data is output from data outputs DO of each memory 86, 87, 88, and 89 in response both to an enable signal on the respective EN input and to a read address applied to the respective read address input RA of each memory 86, 87, 88, and 89. This read address is supplied by connection memories 94 and 99 on address buses 107 and 108 as depicted. In response to the address provided on address bus 106, by channel counter 103, connection memory 94 produces on its data output terminals 93 a ten-bit address indicative of which channel on either bus 83 or 84 (as stored in data memories 86 and 89) is to be connected to the current channel on bus 91. Note that the most significant bit (MSB) from terminal 93 is employed to determine which one of the memories 86 and 89 will be enabled (via the enable input EN of each memory) and the remaining nine bits, on address bus 107, address a storage location in the enabled memory (i.e. either memory 86 or 89) containing data from a specific channel from either bus 83 or 84 which data is then read and applied to data output DO of the enabled memory (i.e. either memory 86 or 89).

Similarly, connection memory 99 produces, on its data output terminals 98, a ten bit address indicative of which channel on either bus 83 or 84 (as stored in data memory 87 or 88) is to be connected to the current channel on bus 92. In other words, the MSB of the address on terminals 98 determines which data memory (i.e. either memory 87 or 88) will be enabled via enable input EN, and the remaining nine bits on address bus 108 address a storage location in the enabled data memory (i.e. either memory 87 or 88) containing data from a specific channel originating from either bus 83 or 84, which data is then read and applied to data output DO of the enabled memory 87 or 88.

Process controller 104 functions in an analogous manner to process controller 71 of FIG. 2. Write address bus 109, from processor 104, defines a location in connection memory 94 (or memory 99) corresponding to a channel on bus 91 (or bus 92). Processor 104, via data bus 110, stores in memory 94 (or memory 99), as data, the addresses of the channels (i.e. from buses 83 and 84) to be connected to bus 91 (or bus 92). These addresses are of course the addresses of locations in data memories 86, 87, 88, and 89 into which data, carried by channels in buses 83 and 84, have been stored.

Consequently, outgoing bus 91 can convey data from up to 512 channels originating from the 1024 channels on both bus 83 and 84. Similarly, outgoing bus 92 can convey data from up to 512 channels originating from the 1024 channels on both bus 83 and 84.

Figure 4:
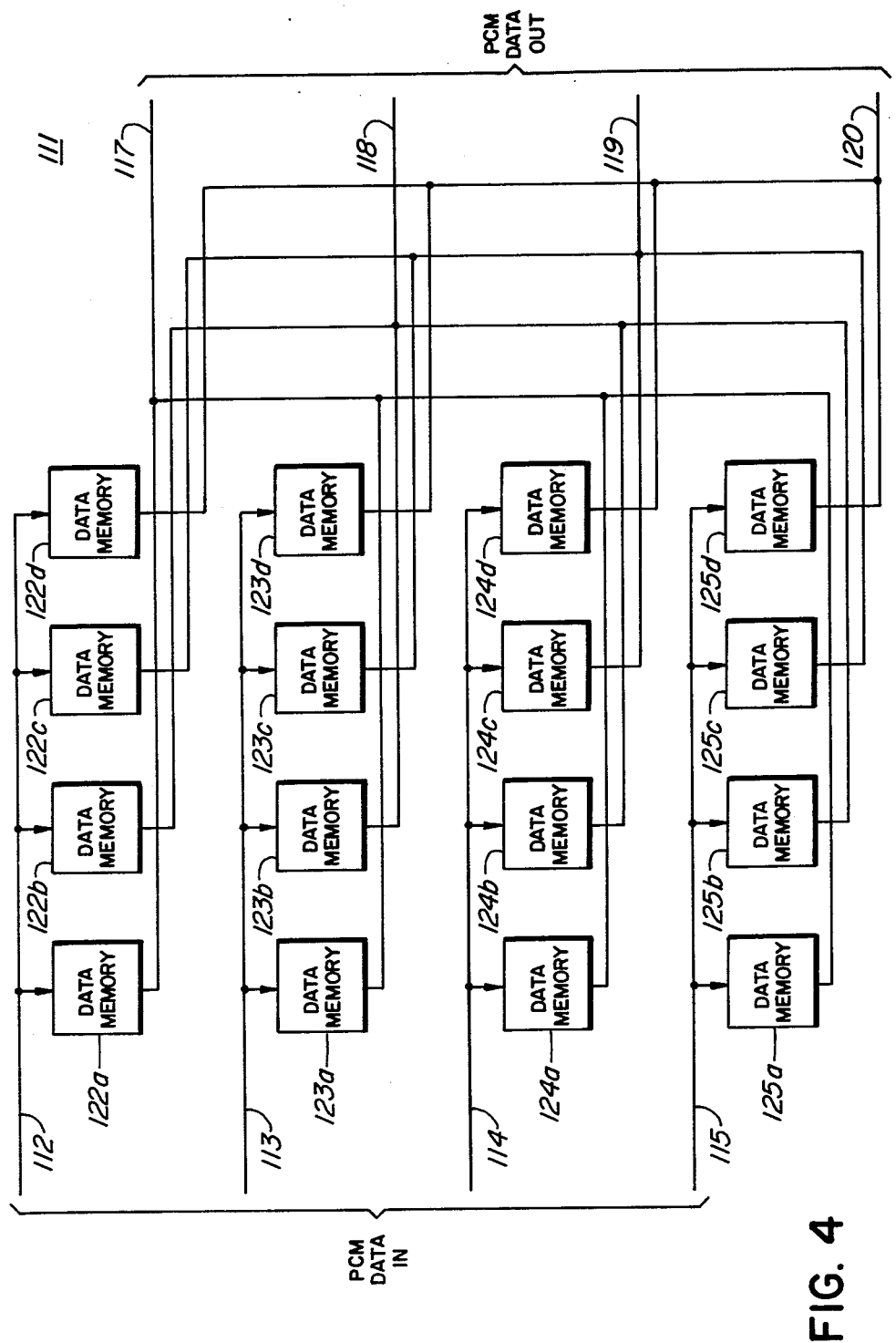
FIG. 4 is a simplified block diagram depicting the preferred embodiment of the present invention for switching 2048 channels.

FIG. 4 depicts a simplified switching network 111, constructed according to the present invention, having four incoming buses 112, 113, 114, and 115 and four outgoing buses 117, 118, 119, and 120. In order to not unduly complicate the description of the FIG. 4 embodiment, only the switching module for network 111 is shown, and the control module is not.

Incoming bus 112 carries 512 channels sequentially, in parallel, and applies them to data memories 122 referred to individually as data memories 122a, 122b, 122c, and 122d. Incoming bus 113 carries 512 channels sequentially in parallel, and applies them to data memories 123 referred to individually as data memories 123a, 123b, 123c, and 123d. Incoming bus 114 carries 512 channels sequentially, in parallel, and applies them to data memories 124 referred to individually as data memories 124a, 124b, 124c, and 124d. Also, incoming bus 115 carries 512 channels sequentially, in parallel, and applies them to data memories 125, referred to individually as data memories 125a, 125b, 125c, and 125d.

Note that the contents of each memory 122 is identical to the contents of the other memories 122. In other words, data memory 122a (e.g. three Intel model no. 2148) has the capacity to store 1024 binary words of ten bits each; memories 122b, 122c, 122d each have the same capacity as memory 122a and have stored in themselves data identical to that stored in memory 122a. Similarly, the four data memories 123 have identical information stored in themselves; the four data memories 124 have identical information stored in themselves; and the four data memories 125 have identical information stored in themselves. Note that each one of the data memories 122b, 122c, 122d, 123a, 123b, 123c, 123d, 124a, 124b, 124c, 124d, 125a, 125b, 125c, and 125d is constructed in a like manner to data memory 122a described earlier.

The object of switching network 111 is to be able to switch any one of the 512 channels appearing on bus 112, 113, 114, or 115 to any one of the 512 channels appearing on bus 117, 118, 119, or 120. The principle behind how switching network 111 accomplishes this is the same as it was for switching network 80 of FIG. 3.

Briefly stated, PCM data on outgoing bus 117 is read from data memory 122a, 123a, 124a, 125a. The selection of which data memory is to be accessed is made by the control module (not shown) of switching network 111. As a result, bus 117 has access to any of the input channels on buses 112, 113, 114, and 115. Similarly, buses 118, 119, and 120 each have access to any of the input channels on buses 112, 113, 114, and 115.

What is claimed is:

1. A switching network for use in a TDM (time division multiplex) system for switching digital signals carried in timeslots on N incoming buses to timeslots on M outgoing buses, wherein N and M are positive integers, $N \geq 2$, and $M \geq 2$, said network comprising:
   a plurality of storage means, said plurality of storage means being divided into N first groupings of M storage means each, each said first grouping being responsive to a respective incoming bus; and
   each outgoing bus being responsive to a respective one of M second groupings of said storage means, each said second grouping comprising N storage means, one from each of said first groupings.

2. The switching network of claim 1 wherein each bus of both said incoming buses and said outgoing buses carries the same number of timeslots as the other buses.

3. The switching network of claim 1 or 2 wherein N equals M.

4. The switching network of claim 1 or 2 wherein each said storage means has the capacity to store all the data received from one bus during one frame.

5. A switching network for use in a TDM (time division multiplex) system for switching digital signals carried in timeslots on N incoming buses to timeslots on N outgoing buses, wherein N is a positive integer, $N \geq 2$, said network comprising:
   a plurality of storage means, said plurality of storage means comprising N first groupings of N storage means each, each said first grouping being responsive to a respective incoming bus; and
   each outgoing bus being responsive to a respective one of N second groupings of said storage means, each said second grouping comprising N storage means, one from each of said first groupings.

6. The switching network of claim 5 wherein N equals two.

7. The switching network of claim 5 wherein N equals four.

8. A method for use in a TDM (time division multiplex) system for switching digital signals carried in timeslots on N incoming buses to timeslots on M outgoing buses, wherein N and M are positive integers, $N \geq 2$, and $M \geq 2$, said method comprising:
   storing the data received from an incoming bus in a respective one of N first groupings, wherein each one of said first groupings comprises M storage means; and
   applying the data from a second grouping of storage means to a respective outgoing bus, wherein there are M second groupings and wherein each said second grouping comprises N storage means, one from each of said first groupings.

9. The method of claim 8 wherein N equals M.

10. The method of claim 9 wherein N equals two.

11. The method of claim 9 wherein N equals four.

* * * * *